(No Model.)
W. T. CHESLEY.
COMBINED NUT AND PIPE WRENCH.
No. 405,343. Patented June 18, 1889.
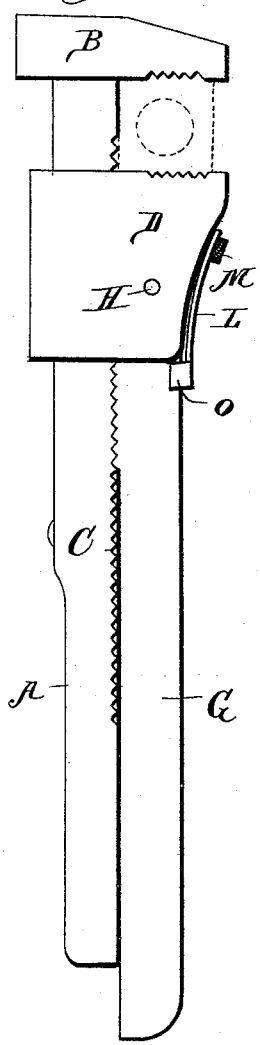
Fig. 1.
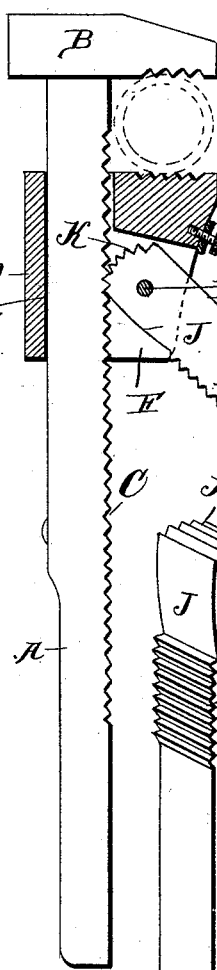
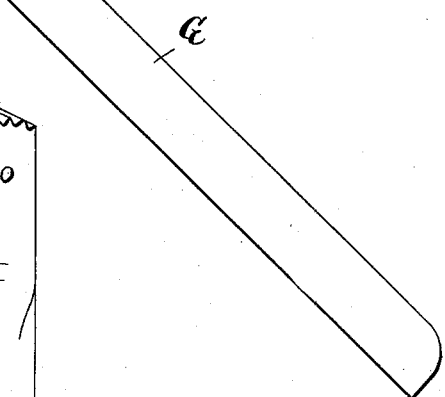
Fig. 2.
Fig. 3.
Witnesses
Henry G. Dietrich
Wm. Bagger
Inventor,
William T. Chesley.
By his Attorneys

UNITED STATES PATENT OFFICE.

WILLIAM T. CHESLEY, OF VIOLA, ILLINOIS.

COMBINED NUT AND PIPE WRENCH.

SPECIFICATION forming part of Letters Patent No. 405,343, dated June 18, 1889.

Application filed February 14, 1889. Serial No. 299,811. (No model.)

*To all whom it may concern:*

Be it known that I, WILLIAM T. CHESLEY, a citizen of the United States, residing at Viola, in the county of Mercer and State of Illinois, have invented new and useful Improvements in Combined Nut and Pipe Wrenches, of which the following is a specification.

This invention relates to that class of combined nut and pipe wrenches which are provided with a sliding jaw capable of suitable adjustment; and it has for its object to provide a device of this class which shall be simple in construction, inexpensive, and durable, and in which, when the device is to be used as a pipe-wrench, the sliding jaw may be forced with a positive movement toward the jaw, which is fixed upon the end of the shank or handle.

The invention consists in the improved construction and arrangement of parts, which will be hereinafter fully described, and particularly pointed out in the claim.

In the drawings, Figure 1 is a side view of my improved wrench. Fig. 2 is a longitudinal sectional view illustrating its use as a pipe-wrench. Fig. 3 is a detailed view of the operating-handle detached from the wrench.

The same letters refer to the same parts in all the figures.

A designates the shank or handle, which is provided at one end with the fixed jaw B. The inner side of the handle is provided with a series of teeth, forming a rack-bar C.

D designates the sliding jaw, which is provided with the longitudinal opening E, by which it is adjusted to slide upon the shank A. The outer edge of the sliding jaw D has a recess F, in which the lever or operating-handle G is pivoted upon a transverse pin H, the ends of which pass through the cheeks of the sliding jaw. The lever or operating-handle is provided upon its inner side for a portion of its length with a series of teeth I, adapted to engage those of the rack-bar C upon the shank or handle. The teeth I do not extend quite to the pivoted end of the lever, which is beveled, as shown at J, so that it will at no time come in contact with the teeth of the rack-bar formed upon the shank or handle. The extreme inner end of the lever or operating-handle is also provided with a series of teeth K, concentric with the pivoted pin H and adapted to engage with the teeth of the rack-bar C when the operating-handle is thrown outward to the position shown in Fig. 2 of the drawings, for the purpose of using the device as a pipe-wrench.

L designates a flat spring secured to the outer side of the sliding jaw by means of a thumb-screw M, and adapted to bear against the outer edge of the operating-handle for the purpose of holding the latter in contact with the shank of the wrench. The free end of this spring is provided with a pair of ears or lugs O O, fitting on either side of the operating-lever and serving to prevent the accidental displacement of said spring from its operating position.

The inner or adjoining faces of the jaws of the wrench may be serrated, as shown in the drawings, so as to enable the said jaws to take a firm hold upon a pipe when the device is to be used as a pipe-wrench. The shank or handle A is also provided with a suitably-located stop P, to prevent displacement of the sliding jaw.

In operation, when the device is to be used as a nut-wrench, the sliding jaw may be readily adjusted to any desired position by simply raising the operating-lever, so as to disengage the teeth upon its inner side from those upon the shank of the wrench. When proper adjustment has been made, the device may be grasped by the shank and operating-handle, thus holding the latter in contact and preventing displacement of the sliding jaw while the wrench is being used. When the device is to be used as a pipe-wrench, the spring is released from the handle G by loosening the thumb-screw M, and thrown to one side. The handle G is then raised to the position shown in Fig. 2, when the teeth K will engage with the rack-bar C, and the sliding jaw will thus be forced in the direction of the fixed jaw, thus causing the jaws to firmly grasp the pipe which is to be operated upon.

Having thus described my invention, I claim and desire to secure by Letters Patent—

The combination of the shank having the rack-bar formed on its inner side and provided with a fixed jaw at its outer end, the sliding jaw, the operating-lever pivoted in a recess in the latter and having a series of teeth upon its inner side, a series of teeth at its inner end concentric with its pivoting-point, and an intermediate beveled portion, and a spring secured adjustably to the sliding jaw and adapted to bear against the operating-lever, substantially as set forth.

In testimony that I claim the foregoing as my own I have hereto affixed my signature in presence of two witnesses.

WILLIAM T. CHESLEY.

Witnesses:
WM. W. LAIR,
W. H. BISSELL.